United States Patent [19]

Langenberg et al.

[11] Patent Number: 4,959,032
[45] Date of Patent: Sep. 25, 1990

[54] WATER CRAFT WITH GUIDE FINS

[75] Inventors: Hans Langenberg; Jürgen Wessel, both of Hamburg, Fed. Rep. of Germany

[73] Assignee: Blohm + Voss AG, Hamburg, Fed. Rep. of Germany

[21] Appl. No.: 241,974

[22] Filed: Sep. 8, 1988

Related U.S. Application Data

[63] Continuation-in-part of Ser. No. 121,312, Nov. 16, 1987, Pat. No. 4,843,989.

[30] Foreign Application Priority Data

Sep. 8, 1987 [DE] Fed. Rep. of Germany ....... 3730008

[51] Int. Cl.$^5$ ............................................... B63H 5/16
[52] U.S. Cl. ........................................ 440/66; 440/69; 114/57
[58] Field of Search ............ 440/66, 68, 69, 70; 114/56, 57, 152, 142, 126, 280

[56] References Cited

U.S. PATENT DOCUMENTS

| | | | |
|---|---|---|---|
| 1,853,158 | 4/1932 | Taylor | 440/66 |
| 2,784,691 | 3/1957 | MacMillan, Jr. | 114/57 |
| 2,878,772 | 3/1959 | Kjekstad | 114/142 |
| 3,793,980 | 2/1974 | Sherman | 440/69 |
| 3,924,557 | 12/1975 | Bloch | 115/38 |
| 3,937,173 | 2/1976 | Stuart | 115/39 |
| 4,004,534 | 1/1977 | Allison | 114/274 |
| 4,010,707 | 3/1977 | Bendall | 115/12 R |
| 4,300,889 | 11/1981 | Wormser | 440/69 |
| 4,383,828 | 5/1983 | Wynne | 440/69 |
| 4,406,635 | 9/1983 | Wührer | 440/69 |
| 4,428,734 | 1/1984 | Ludlow | 440/75 |
| 4,459,116 | 7/1984 | Moore | 440/31 |
| 4,606,291 | 8/1986 | Hoppe | 114/280 X |
| 4,609,360 | 9/1986 | Whitehead | 440/69 |
| 4,629,432 | 12/1986 | Dyrkorn et al. | 440/52 |
| 4,672,905 | 6/1987 | Pipkorn | 114/56 |
| 4,689,026 | 8/1987 | Small | 440/66 |
| 4,746,314 | 5/1988 | Levi | 440/66 |
| 4,756,265 | 7/1988 | Lane | 114/57 |

FOREIGN PATENT DOCUMENTS

| | | | |
|---|---|---|---|
| 2441556 | 9/1975 | Fed. Rep. of Germany . | |
| 50889 | 3/1984 | Japan | 114/57 |
| 39394 | 2/1987 | Japan | 114/126 |
| 97490 | 4/1988 | Japan | 440/66 |

Primary Examiner—Sherman Basinger
Attorney, Agent, or Firm—Nils H. Ljungman & Associates

[57] ABSTRACT

A hull for a water vessel which includes an elongated displacement vessel having bow and stern extremities, a major longitudinal and normally horizontal axis, a transverse and normally perpendicular axis, a length of about L along the longitudinal axis, a propeller mechanism near the stern extremity and a guide vane which is located at a distance of between about ¼ L and ½ L (preferably about ⅓ L) ahead of the propeller mechanism.

6 Claims, 6 Drawing Sheets

CROSS SECTION B-B

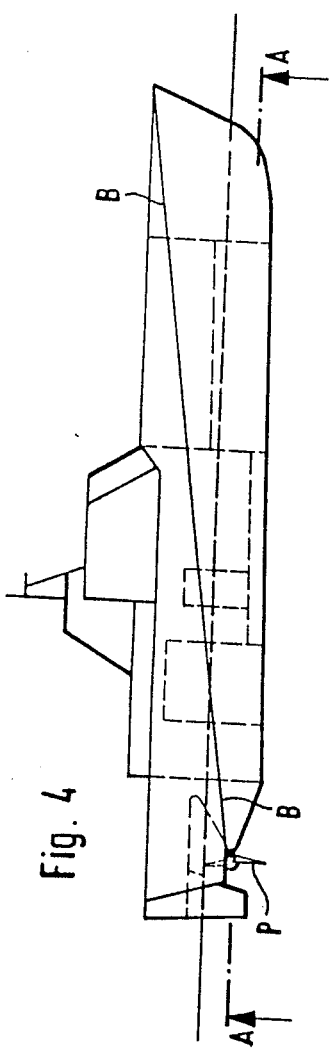
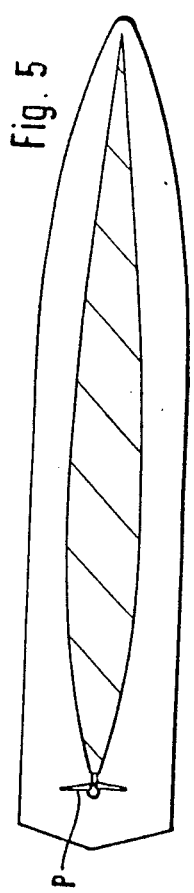

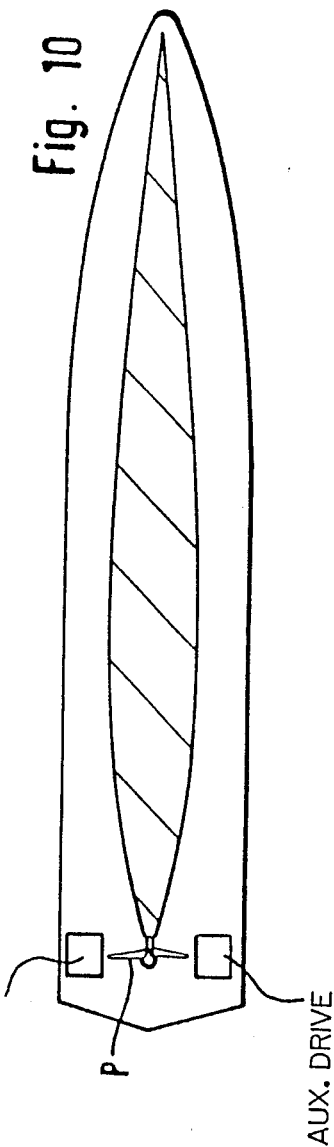

WATER CRAFT WITH GUIDE FINS

CROSS-REFERENCES TO RELATED APPLICATIONS

The present application is a continuation-in-part of U.S. patent application Ser. No. 07/121,312, entitled "SHIP'S HULL FOR SMALL VESSELS AND HIGH SPEEDS" and filed Nov. 16, 1987 and issued as U.S. Pat. No. 4,843,989 on July 4, 1989.

BACKGROUND OF THE INVENTION

1. Field of the Invention

On boats and ships, and in particular on single screw vessels, the non-uniform flow of water to the propeller presents a problem. In other words, the strength and direction of the flow to the propeller can vary to some degree (more or less significantly) in the area of the propeller blades. Such a situation can result due to the deflection of the flow around the ship's hull ahead of the propeller, which may not have the same shape as the propeller shaft.

2. Description of the Prior Art

The propulsion disadvantages which result from this lack of uniformity are numerous, however, and provide the impetus for the present invention. The following phenomena can be considered resulting disadvantages:

a. Reductions in the efficiency of the thrust produced, since the propeller may not always receive the flow at an optimum angle;

b. Vibrations produced by the propeller blades not receiving a uniform flow during one revolution of the propeller, resulting in periodic pressure pulses on the propeller surface and the external skin of the vessel;

c. Cavitation and erosion of the propeller blades: and d. Propeller noise.

Almost the only means known in the prior art to eliminate these disadvantages is to provide guide surfaces or nozzles in the immediate vicinity of the propeller, close ahead of the propeller and in the area of the mountings on the hull. See, for example, DE-PS No. 24 41 556. In contrast to the guide surfaces and nozzles of the prior art immediately ahead of the propeller, the present invention provides that the flow to the propeller be influenced far ahead of the propeller, because then the same effect can be achieved with smaller deflection angles and a lower resistance.

U.S. Pat. No. 4,746,314, issued May 24, 1988 and entitled "Combined Propulsion and Steering System for a Motor Boat with an Inboard Engine"; U.S. Pat. No. 4,756,265, issued July 12, 1988 and entitled "High Speed Boat Lifting Structures": U.S. Pat. No. 4,689,026, issued Aug. 25, 1987 and entitled "Propeller Tunnel Baffle and Method": U.S. Pat. No. 4,672,905, issued June 16, 1987 and entitled "Boat Hull with Center V-Hull and Sponsons": U.S. Pat. No. 4,629,432, issued Dec. 16, 1986 and entitled "Elastically Supported Thruster Structure"; U.S. Pat. No. 4,406,635, issued Sept. 27, 1983 and entitled "Marine Vessel with at Least One Propeller"; and U.S. Pat. No. 4,004,534, issued Jan. 25, 1987 and entitled "Boat Hull" are all examples of prior art which relate to ships or vessels employing propeller propulsion and/or having fluid deflection surfaces, and the technical concerns relating thereto.

All of the above mentioned prior art documents are hereby expressly incorporated by reference, with the same effect as if set forth in their entireties herein.

OBJECT OF THE INVENTION

One object of the present invention is therefore to act on the flow to the propeller far ahead of the propeller, by locating guide fins approximately one-third of the ship's length ahead of the propeller.

SUMMARY OF THE INVENTION

These fins may be constructed so that their adjustment in relation to the flow direction can be changed, so as to maintain the optimum flow to the propeller at different ship speeds and drafts.

It is also possible to couple the fins with means for adjusting the fins in relation to one another, as a function of the roughness of the water, so that, when the sea is rough, the guide fins can produce a roll damping action.

Also contemplated is the provision of one or more fins on only one side of a ship, thereby producing a flow which is different on the starboard side than on the port side, whereby the known asymmetry of the propeller thrust could be counteracted.

For slender ships with a tunnel stern and/or a bulbous stern, guide fins may be installed between the edges of the tunnel stern and the keel, in the manner of a bridge.

The fins may also be installed, in all cases, as rigid fins with an adjustable rudder plate, like the aileron of the prior art on an airplane wing.

In summing up, one aspect of the invention resides broadly in a hull for a water vessel, the hull comprising an elongated displacement body, the elongated displacement body having a bow extremity and a stern extremity, the elongated displacement body having a major longitudinal and normally horizontal axis and a transverse and normally perpendicular axis, the length of the elongated displacement body along the major longitudinal axis being substantially equal to L; a propeller arrangement for propelling the elongated displacement body through water, the propeller arrangement being disposed near the stern extremity of the elongated displacement body; and at least one guide vane provided on the elongated displacement body; the at least one guide vane being located at a distance between about $\frac{1}{4}$ L and about $\frac{1}{2}$ L from the propeller arrangement towards the bow extremity.

The present invention will now be described by way of particular preferred embodiments, reference being had to the accompanying drawings, wherein:

BRIEF DESCRIPTION OF THE DRAWINGS

FIG. 2b is a view of the same hull in cross section along Line B—B in FIG. 2a.

FIG. 4 shows a side view of a ship designed with a "tunnel" hull, with the body plan shown in FIG. 7.

FIG. 5 shows a view from below of the hull of the ship of FIG. 4, with a horizontal section along Line A—A in FIG. 4.

FIG. 10 is a bottom plan sectional view of an alternate embodiment of the ship s hull of FIGS. 4-9, wherein auxiliary drives are provided in addition to a central main propeller.

DESCRIPTION OF THE PREFERRED EMBODIMENTS

Figure 1A:
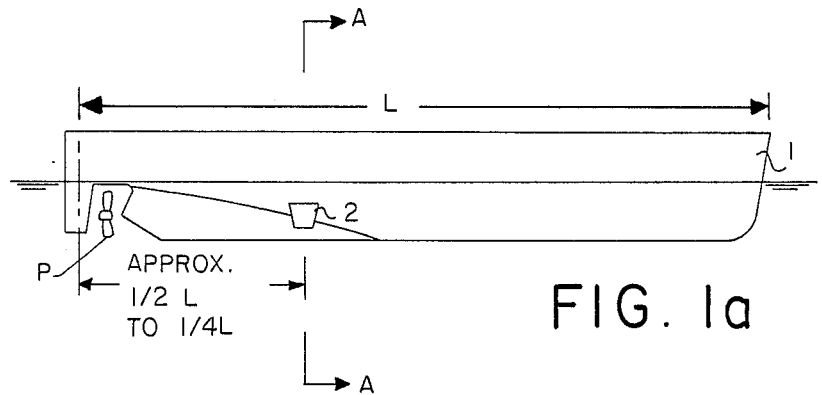
FIG. 1a is a side view of a hull with fins according to the invention.
Figure 1B:
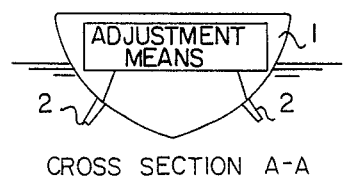
FIG. 1b is a view of the same hull in cross section along Line A-A in FIG. 1a with the fins installed on the port and starboard sides.

Referring first to FIGS. 1a and 1b, a hull 1 of a ship or vessel generally comprising an elongated displacement body is provided with at least one or a plurality of fins, vanes or deflection surfaces 2 extending outward from the hull 1. Vanes or fins 2 present lateral surfaces which are angularly inclined with respect to a normally perpendicular axis of hull 1. As noted particularly in FIG. 1a, vanes or fins 2 are located at a distance of between about $\frac{1}{4}$ L and about $\frac{1}{2}$ L (most preferably at a distance of about $\frac{1}{3}$ L) from a propeller P towards the bow extremity, where L is the general overall hull length.

As shown most clearly in FIG. 1b, at least one vane or fin 2 may be provided on each of the opposing sides of the hull 1 (i.e., on each of the port and starboard sides), the opposing sides of hull 1 being generally divided by the transverse and normally perpendicular axis of hull 1. Also, as shown in FIG. 1b, vanes or fins 2 provided on the port and starboard sides may be substantially symmetrically configured and also substantially symmetrically positioned and inclined with respect to both the perpendicular and horizontal longitudinal axes of hull 1.

Additionally, however, as noted above, the present invention also contemplates the provision of a vane or fin 2 on only one side (i.e., either the port or starboard side) to counteract an asymmetrical propeller thrust, or similarly, the provision of dissimilarly configured, inclined or positioned vanes or fins on opposing sides of hull 1.

By means well known in the art, for example, by means extensively described in the patents and documents incorporated by reference herein, vanes or fins 2 may be selectively angularly rotated about axes substantially transverse to the adjoining exterior surfaces of hull 1 so as to present either substantially similar or relatively differing lateral flow surfaces, in order to either optimize the flow of water to propeller P, to provide a damping action to rolling in relatively rough seas or to produce an asymmetrical water flow so as to compensate for the natural asymmetric thrust of propeller P.

Figure 2A:
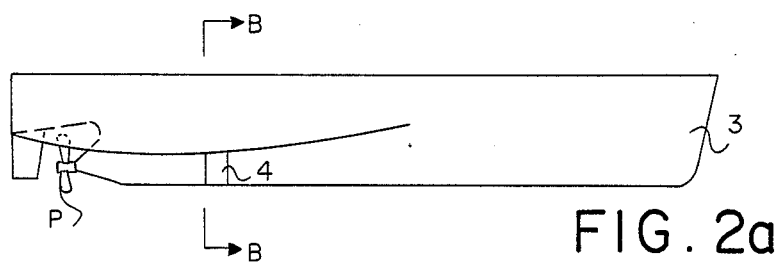
FIG. 2a is a view of a hull with a tunnel stern, whereby the fins are constructed in a bridge-like fashion.
Figure 2B:
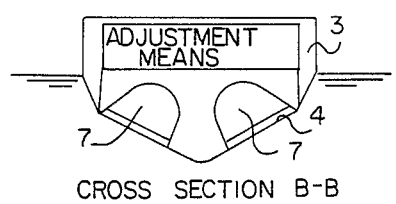

Referring now to FIGS. 2a and 2b, in an alternative embodiment of the invention, a "tunnel" hull 3 is shaped, over its generally rearward portion, so as to exhibit two inwardly concave surfaces 7, inwardly concave surfaces 7 being generally disposed on opposing sides (i.e., the port and starboard sides) of the generally perpendicular axis of hull 3. Vanes, fins or deflection surfaces 4 are also provided in this embodiment, and are preferably mounted so as to "bridge" across inwardly concave depressions 7. Even more preferably, as shown, vanes or fins 4 are mounted adjacent the most outward openings of inwardly concave depressions 7. In this embodiment also, vanes or fins 4 are located between about $\frac{1}{4}$ L to about $\frac{1}{2}$ L ahead of propeller P, most preferably at a distance of about $\frac{1}{3}$ L.

As was the case with the first embodiment discussed above, it is contemplated as being within the scope of the present invention that vanes or fins 4 may be either similarly or dissimilarly configured, inclined and/or positioned so as to effect either a symmetrical or purposely asymmetrical flow of water on opposing sides of the hull 3. Similarly, at least one vane or fin 4 may be provided on each opposing side of hull 3, or but a single vane or fin 4 may be provided on either the port or starboard side.

Moreover, by means well known in the art and disclosed in the documents incorporated herein, vanes or fins 4 may be selectively rotated about their longitudinal axes so as to provide either symmetrical flow or asymmetrical flow in order to maintain optimum flow to propeller P, effect a roll damping action or compensate for asymmetrical propeller thrust.

Figure 3:
FIG. 3 is a view of a portion of the hull with a rigid fin fastened to it, which is equipped with an adjustable rudder plate.

Referring now to FIG. 3, in yet another embodiment of the invention, a vane, fin or deflection surface 5 protrudes generally transversely with respect to the exterior surface of the hull 1 of a vessel. Vane or fin 5 is itself generally fixed with respect to hull 1 but is provided with a flap portion 6, the lateral surface of which is generally inclinable with respect to the angular positioning of the lateral surface of vane or fin 5. Rotation and positioning of flap portion 6 may be accomplished by means well known in the art and disclosed in documents incorporated herein. For example, rotation and positioning of flap portion 6 may be accomplished by means similar to those used to control the ailerons of airplane wings known in the prior art.

The arrangement shown in FIG. 3 having a fixed vane or portion and a flap portion 6 movable with respect thereto may be employed and incorporated into either the embodiment of FIGS. 1a and 1b or the embodiment of FIGS. 2a or 2b discussed above.

We turn now to FIGS. 4-10, which illustrate in detail the construction of a "tunnel" hull of the type discussed above in connection with FIGS. 2a and 2b.

Small, fast ships, in particular motorboats and military vessels, are predominantly designed as dual-screw (or dual propeller) vessels, because with two or four screws, the propeller's tendency toward cavitation is reduced, and hydrodynamic non-uniformity of the drive can be prevented.

The prior art includes the following solutions to prevent cavitation:

1. The production of a uniform slipstream field in the axial, radial and tangential direction;

2. The prevention of a diagonal flow;

3. The choice of a large propeller diameter and/or a high surface ratio; and

4. The distribution of the power to two propellers located one behind the other (contra-rotating propellers).

In addition, the prior art does not include suitably high-powered drive equipment.

Finally, even today, the argument is used that with dual-screw (or dual propeller) vessels the vessel still be operated even if one drive engine fails, and that the dual-screw drive allows improved maneuvering characteristics.

In commercial shipping, multi-screw drives have been almost completely abandoned in the last ten to fifteen years, because a single-screw drive reduces the investment cost by approximately 10 percent and the fuel costs by approximately 15 percent. In addition, the control characteristics of the vessel are significantly better during slow-speed travel than with dual-screw vessels, if the latter are equipped with a central rudder.

Examples of prior art which relate to ships or vessels employing propeller propulsion, and the technical concerns relating thereto, are: U.S. Pat. No. 4,383,828, entitled "Power Boat with Extended Propeller Pocket"; U.S. Pat. No. 4,459,116, entitled "Screw Propelled Water Saddle"; U.S. Pat. No. 4,010,707, entitled "Marine Propulsion Unit"; U.S. Pat. No. 4,428,734, entitled "Planing-Hull Type Boats and Power Drives Therein"; U.S. Pat. No. 3,937,173, entitled "Deep-V Tunnel Stern Boat"; U.S. Pat. No. 3,924,557, entitled "Propeller Mechanism for Boats"; U.S. Pat. No. 4,609,360, entitled "Boat Hull with Flow Chamber"; and U.S. Pat. No. 4,300,889, entitled "Shallow Draft Propeller Pocket".

All of the aforementioned prior art documents relating to propeller driven ships or vessels are hereby expressly incorporated by reference, with the same effect as if set forth in their entireties herein.

The object of the boat hull set forth in FIGS. 4-10 is, therefore, the replacement of the dual-screw drive by a single-screw drive for fast, small ships, in particular, for motorboats and military vessels. It presupposes the elimination of undesirable cavitation and the resulting noises and vibrations.

The following are the advantages and improvements achieved, in particular, for fast boats:

1. A reduction of the hull resistance on account of a movement of the displacement center of gravity inward, i.e., by providing a small entry angle in the forebody:

2. Elimination of the resistance caused by the bearings of the lateral propeller shafts (10-15 percent of the total resistance);

3. An improvement of the ship's propeller performance factor by utilizing the displacement downwash (5-10 percent);

4. A recovery of the energy of rotation from the wake of the first propeller through the use of a CR (or contra-rotating) propeller (5-10 percent).

These improvements produce, among other things, an increase in the range (radius of action) and/or the loading capacity for loose equipment, or a decrease in size of the ship.

FIG. 4 shows a small, fast ship the hull of which, as is generally shown in FIG. 4, is located beneath a line B sloping from the forward and uppermost prow of the ship downward and rearward to the general vicinity of the ship's propeller P.

Ships which may advantageously employ the type of hull here illustrated will typically be small, fast ships in the general class of 40-50 meters in length, such as patrol-torpedo boats (or "PT boats"). However, it is contemplated that the hull here illustrated could be employed for larger or smaller ships or vessels.

The ship's hull shown in FIG. 4, and illustrated in greater detail in FIGS. 5-10, may be constructed of any suitable material, such as steel, aluminum, fiberglass, plastic, etc.

FIG. 5 is a upwardly looking horizontal sectional view along the lines A—A shown in FIG. 4. As is clearly shown in FIG. 5, the bottom portion of the ship's hull, when viewed in a sectional plan view, consists of a bulb shaped displacement body which extends roughly over the entire length of the ship. The displacement body is narrowly tapered towards the bow of the ship and provides a narrow entry angle at its foremost portion. The displacement body then becomes uniformly wider as it proceeds towards the stern of a ship, becoming widest at a position which is approximately two-thirds of the ship's length towards the stern. The displacement body thereafter begins a gradual narrowing taper and terminates proximate a large centrally mounted propeller P.

Figure 6:
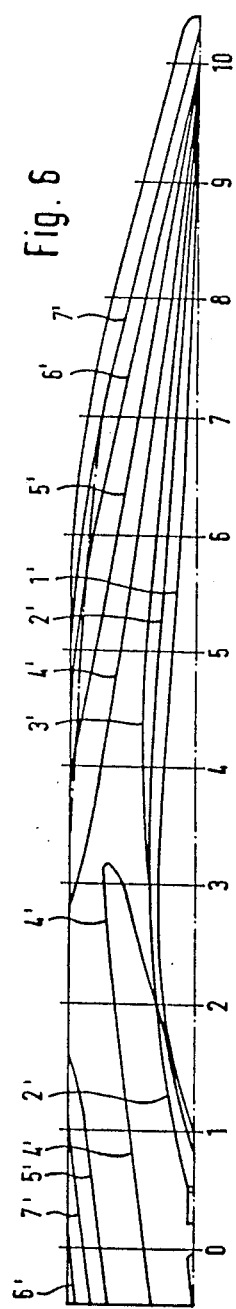
FIGS. 6 and 7 show, respectively, a half water line plan and a body plan of the ship of FIGS. 4 and 5.
Figure 7:
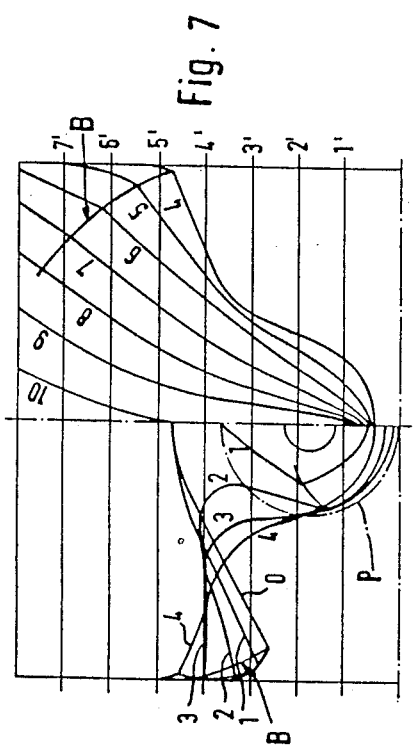

FIGS. 6 and 7 should be viewed in conjunction with one another. In FIG. 6, there is shown a half bottom plan view of the ship's hull, wherein contour lines (i.e., lines of substantially constant relative elevation) 1'-7' are shown, so as to indicate the shaping and configuration of the hull. Additionally, in FIG. 6, longitudinal positions (or stations) 0-10 denote various longitudinal positions along the length of the hull.

Referring now to FIG. 7, it will be seen that the afore-mentioned relative elevational indicators 1'-7' denote constant heights above the bottommost portion of the ship's hull. Additionally shown in FIG. 7 are a series of ship's hull profiles 1-10 which indicate the vertical profile of the ship's hull at the various longitudinal positions 0-10 shown in FIG. 6. While only half of the ship's hull profile at longitudinal positions 0-10 is shown in FIG. 7, it will be understood by those skilled in the art that the hull is substantially symmetrical with respect to the center line and therefore the half profile not shown will be essentially a mirror image of the half profile indicated.

Still referring to FIG. 7, it will be seen that the displacement body is relatively narrow at its forwardmost position, as shown by half profile 10 in FIG. 7, and as is indicated by the sectional plan view of FIG. 5. Thereafter, and preceding towards the stern, the displacement body gradually tapers outwards, as is shown by the gradually widening half profiles 9-5. Beginning at approximately longitudinal position 4 (which corresponds to approximately two-thirds of the ship's length), the ship's hull profiles begin to assume an inwardly concave curvature, which produces a gradual narrowing of the displacement body from the approximately two-thirds position towards the stern of the ship. This inward concave curvature of the hull is progressively accentuated through longitudinal positions 3, 2 and 1, and results in sharply concave and trough shaped indentations formed just forward and above the propeller P which is located intermediate between longitudinal positions 0 and 1. Finally, at the sternmost longitudinal position 0, the hull is substantially concave upwards.

Also shown in FIG. 7 is a break line B which indicates a sharp angular discontinuity in the otherwise generally smooth curvature of the hull. This break line B is also indicated in FIG. 4.

Figure 8:
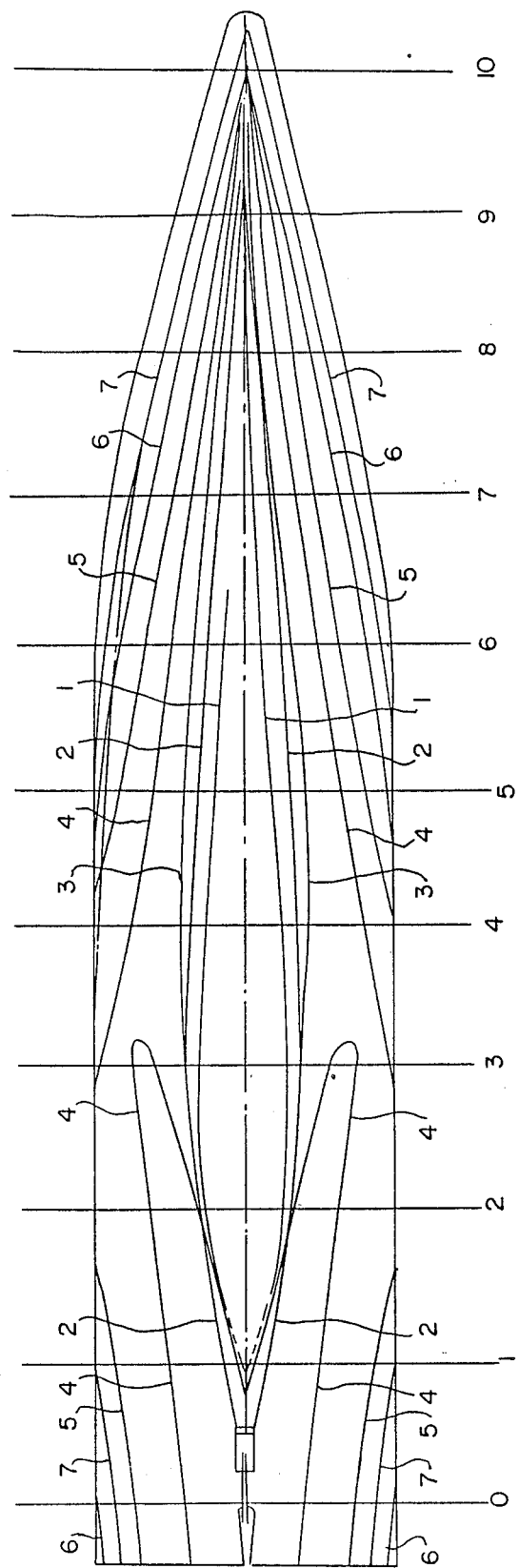
FIG. 8 is an expanded bottom plan view of the ship's hull of FIGS. 4-7.

FIG. 8 is an expanded bottom plan view of the ship's hull, wherein both sides of the hull have been shown, wherein lines of relatively constant elevation 1'-7' have been indicated and wherein a background grid has been provided for determining relative degrees of curvature of various portions of the hull. For example, the substantially constant elevational line 5' could be determined (or plotted) from the grid background of FIG. 8 as follows:

Considering the intersection of longitudinal position 4 and the centerline of the hull to be the origin, the approximate plotting of the hull would be as follows:

| x | 0 | 5 | 10 | 15 | 20 | 25 | 30 |
|---|---|---|---|---|---|---|---|
| y | 10.5 | 9.5 | 8.7 | 7.8 | 7.0 | 6.0 | 5.3 |
| x | 35 | 40 | 45 | 50 | 55 | 60 | |
| y | 4.3 | 3.7 | 2.8 | 2.0 | 1.0 | 0 | |

Figure 9:
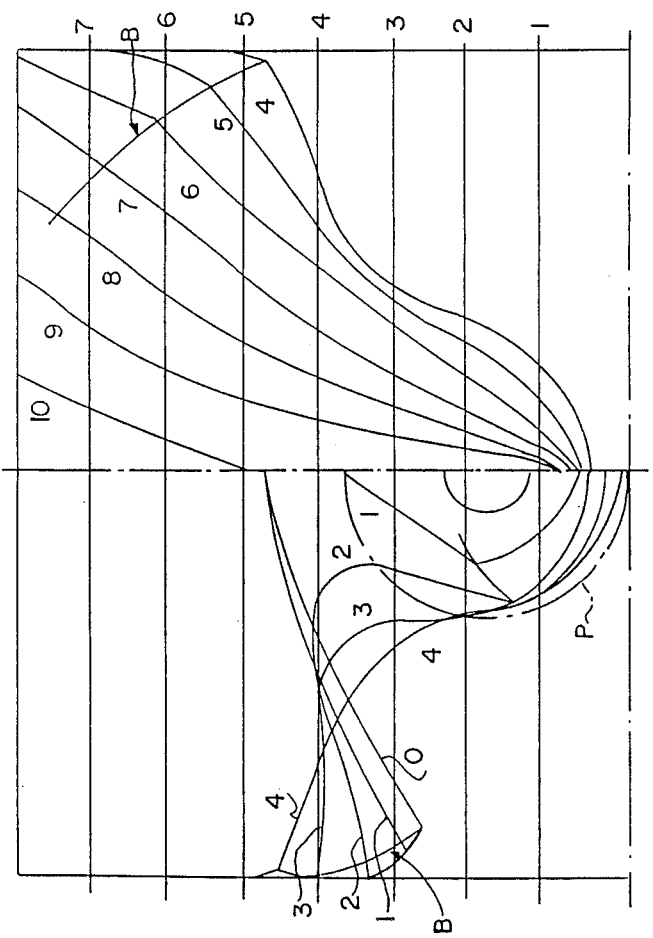
FIG. 9 is an expanded series of profiles of the ship's hull of FIG. 8.

FIG. 9 is an expanded series of half profiles of the ship's hull, provided with a grid background for purposes of determining the relative degrees of curvature of the vertical profile of the ship's hull. For example, the half profile of the ship's hull at longitudinal position 5 could be substantially determined (or plotted) as follows:

Considering the origin as being the intersection of the bottom line and the center line of FIG. 9:

| x | 0 | 5 | 10 | 15 | 20 | 25 |
|---|---|---|---|---|---|---|
| y | 3.3 | 6.7 | 14.6 | 20.3 | 24.3 | 23.8 |

While the above determinations of curvatures have been performed with respect to only one profile provided in each of FIGS. 8 and 9, it will be clear to those of ordinary skill in the art that similar calculations can be carried out with respect to the remaining profiles shown.

As noted above, it is contemplated that the ship's hull here illustrated may be used with a variety of ships and vessels of various sizes. Accordingly, FIG. 8 and 9 should not be taken to represent one particular scale. Nor should they be taken to necessarily correspond to a common scale. Rather, it will be clear to one skilled in the art that he or she may adapt the relative proportionings shown in FIGS. 8 and 9 so as to equip any one of a number of vessels of various sizes with a hull constructed as here illustrated.

The invention as described hereinabove in the context of a preferred embodiment is not to be taken as limited to all of the provided details thereof, since modifications and variations thereof may be made without departing from the spirit and scope of the invention.

What is claimed is:

1. A hull for a water vessel, said hull comprising:
   an elongated displacement body, said elongated displacement body having a bow extremity and a stern extremity, said elongated displacement body having a major longitudinal and normally horizontal axis and a transverse and normally perpendicular axis, the length of said elongated displacement body along said major longitudinal axis being substantially equal to L;
   propeller means for propelling said elongated displacement body through water, said propeller means being disposed near said stern extremity of said elongated displacement body; and
   at least one guide vane provided on said elongated displacement body;
   said at least one guide vane being located at a distance between about $\frac{1}{4}$L and about $\frac{1}{2}$ L from said propeller means towards said bow extremity; and
   said at least one guide vane comprising means for optimizing the flow of water to said propeller means;
   wherein said elongated displacement body comprises a tunnel hull having at least one inwardly concave depression formed therein and extending forward from said propeller means, and wherein said at least one guide vane is disposed so as to bridge across said at least one inwardly concave depression.

2. A hull for a water vessel, said hull comprising:
   an elongated displacement body, said elongated displacement body having a bow extremity and a stern extremity, said elongated displacement body having a major longitudinal and normally horizontal axis and a transverse and normally perpendicular axis, the length of said elongated displacement body along said major longitudinal axis being substantially equal to L;
   propeller means for propelling said elongated displacement body through water, said propeller means being disposed near said stern extremity of said elongated displacement body; and
   at least one guide vane provided on said elongated displacement body;
   said at least one guide vane being located at a distance between about $\frac{1}{4}$L and about $\frac{1}{2}$ L from said propeller means towards said bow extremity; and
   said at least one guide vane comprising means for optimizing the flow of water to said propeller means;
   wherein said at least one guide vane comprises at least a first guide vane and at least a second guide vane, said first and second guide vanes being located on opposite sides of said elongated displacement body divided by said transverse and generally perpendicular axis;
   wherein said elongated displacement body comprises a tunnel hull having at least first and second inwardly concave depressions formed therein, extending forward from said propeller means and located on opposing sides of said transverse and generally perpendicular axis, and wherein said first and second guide vanes are disposed so as to bridge across said first and second inwardly concave depressions, respectively.

3. A hull for a water vessel, said hull comprising:
   an elongated displacement body, said elongated displacement body having a bow extremity and a stern extremity, said elongated displacement body having a major longitudinal and normally horizontal axis and a transverse and normally perpendicular axis, the length of said elongated displacement body along said major longitudinal axis being substantially equal to L;
   propeller means for propelling said elongated displacement body through water, said propeller means being disposed near said stern extremity of said elongated displacement body; and
   at least one guide vane provided on said elongated displacement body;
   said at least one guide vane being located at a distance between about $\frac{1}{4}$L and about $\frac{1}{2}$ L from said propeller means towards said bow extremity; and
   said at least one guide vane comprising means for optimizing the flow of water to said propeller means;
   wherein said at least one guide vane comprises at least a first guide vane and at least a second guide vane, said first and second guide vanes being located on opposite sides of said elongated displacement body divided by said transverse and generally perpendicular axis;
   wherein said first guide vane comprises at least one first lateral surface and said second guide vane comprises at least one second lateral surface, and further comprising adjustment means for varying the angular inclinations of said first and second lateral surfaces with respect to said elongated displacement body;

wherein said elongated displacement body comprises a tunnel hull having at least first and second inwardly concave depressions formed therein, extending forward from said propeller means and located on opposing sides of said transverse and generally perpendicular axis, and wherein said first and second guide vanes are disposed so as to bridge across said first and second inwardly concave depressions, respectively.

4. A hull for a water vessel, said hull comprising:

an elongated displacement body, said elongated displacement body having a bow extremity and a stern extremity, said elongated displacement body having a major longitudinal and normally horizontal axis and a transverse and normally perpendicular axis, the length of said elongated displacement body along said major longitudinal axis being substantially equal to L;

propeller means for propelling said elongated displacement body through water, said propeller means being disposed near said stern extremity of said elongated displacement body; and at least one guide vane provided on said elongated displacement body;

said at least one guide vane being located at a distance between about $\frac{1}{4}$L and about $\frac{1}{2}$ L from said propeller means towards said bow extremity; and said at least one guide vane comprising means for optimizing the flow of water to said propeller means;

wherein said at least one guide vane comprises at least a first guide vane and at least a second guide vane, said first and second guide vanes being located on opposite sides of said elongated displacement body divided by said transverse and generally perpendicular axis;

wherein said first guide vane comprises at least one first lateral surface and said second guide vane comprises at least one second lateral surface, and further comprising adjustment means for varying the angular inclinations of said first and second lateral surfaces with respect to said elongated displacement body;

wherein said adjustment means additionally comprises means for independently varying the angular inclinations of said first and second lateral surfaces with respect to said elongated displacement body;

wherein said elongated displacement body comprises a tunnel hull having at least first and second inwardly concave depressions formed therein, extending forward from said propeller means and located on opposing sides of said transverse and generally perpendicular axis, and wherein said first and second guide vanes are disposed so as to bridge across said first and second inwardly concave depressions, respectively.

5. A hull for a water vessel, said hull comprising:

an elongated displacement body, said elongated displacement body having a bow extremity and a stern extremity, said elongated displacement body having a major longitudinal and normally horizontal axis and a transverse and normally perpendicular axis, the length of said elongated displacement body along said major longitudinal axis being substantially equal to L;

propeller means for propelling said elongated displacement body through water, said propeller means being disposed near said stern extremity of said elongated displacement body; and at least one guide vane provided on said elongated displacement body;

said at least one guide vane being located at a distance between about $\frac{1}{4}$L and about $\frac{1}{2}$ L from said propeller means towards said bow extremity; and said at least one guide vane comprising means for optimizing the flow of water to said propeller means;

wherein said at least one guide vane comprises at least a first guide vane and at least a second guide vane, said first and second guide vanes being located on opposite sides of said elongated displacement body divided by said transverse and generally perpendicular axis;

wherein said first guide vane comprises at least one first lateral surface and said second guide vane comprises at least one second lateral surface, and further comprising adjustment means for varying the angular inclinations of said first and second lateral surfaces with respect to said elongated displacement body;

wherein each of said first and second guide vanes comprise a first vane portion rigidly attached to said elongated displacement body and a second vane portion angularly displaceable with respect to said first vane portion, and wherein said first and second lateral surfaces comprise surfaces of said second vane portions;

wherein said elongated displacement body comprises a tunnel hull having at least first and second inwardly concave depressions formed therein, extending forward from said propeller means and located on opposing sides of said transverse and generally perpendicular axis, and wherein said first and second guide vanes are disposed so as to bridge across said first and second inwardly concave depressions, respectively.

6. A hull for a water vessel, said hull comprising:

an elongated displacement body, said elongated displacement body having a bow extremity and a stern extremity, said elongated displacement body having a major longitudinal and normally horizontal axis and a transverse and normally perpendicular axis, the length of said elongated displacement body along said major longitudinal axis being substantially equal to L;

propeller means for propelling said elongated displacement body through water, said propeller means being disposed near said stern extremity of said elongated displacement body; and at least one guide vane provided on said elongated displacement body;

said at least one guide vane being located at a distance between about $\frac{1}{4}$L and about $\frac{1}{2}$ L from said propeller means towards said bow extremity; and said at least one guide vane comprising means for optimizing the flow of water to said propeller means;

wherein said at least one guide vane comprises at least a first guide vane and at least a second guide vane, said first and second guide vanes being located on opposite sides of said elongated displacement body divided by said transverse and generally perpendicular axis;

wherein said first guide vane comprises at least one first lateral surface and said second guide vane comprises at least one second lateral surface, and further comprising adjustment means for varying the angular inclinations of said first and second lateral surfaces with respect to said elongated displacement body;

wherein each of said first and second guide vanes comprise a first vane portion rigidly attached to said elongated displacement body and a second vane portion angularly displaceable with respect to said first vane portion, and wherein said first and second lateral surfaces comprise surfaces of said second vane portions;

wherein said adjustment means additionally comprises means for independently varying the angular inclinations of said first and second lateral surfaces with respect to said elongated displacement body;

wherein said elongated displacement body comprises a tunnel hull having at least first and second inwardly concave depressions formed therein, extending forward from said propeller means and located on opposing sides of said transverse and generally perpendicular axis, and wherein said first and second guide vanes are disposed so as to bridge across said first and second inwardly concave depressions, respectively.

* * * * *